(12) United States Patent
Lemaitre et al.

(10) Patent No.: US 10,770,950 B2
(45) Date of Patent: Sep. 8, 2020

(54) SUSPENSION MODULE, ELECTROMECHANICAL ACUTATOR COMPRISING SUCH A SUSPENSION MODULE, AND CLOSURE OR SUN PROTECTION SYSTEM COMPRISING SUCH A SUSPENSION MODULE OR SUCH AN ELECTROMECHANICAL ACTUATOR

(71) Applicant: Somfy Activites SA, Cluses (FR)

(72) Inventors: Sébastien Lemaitre, Cluses (FR); Julien Peillex, Cluses (FR); Adrien Brondex, Domancy (FR)

(73) Assignee: SOMFY ACTIVITIES SA, Cluses (FR)

( * ) Notice: Subject to any disclaimer, the term of this patent is extended or adjusted under 35 U.S.C. 154(b) by 0 days.

(21) Appl. No.: 16/467,389

(22) PCT Filed: Dec. 7, 2017

(86) PCT No.: PCT/EP2017/081927
§ 371 (c)(1),
(2) Date: Jun. 6, 2019

(87) PCT Pub. No.: WO2018/104488
PCT Pub. Date: Jun. 14, 2018

(65) Prior Publication Data
US 2020/0099271 A1 Mar. 26, 2020

(30) Foreign Application Priority Data

Dec. 7, 2016 (FR) ..................... 16 62056

(51) Int. Cl.
| | | |
|---|---|---|
| *H02K 5/24* | (2006.01) | |
| *E06B 9/72* | (2006.01) | |
| *H02K 7/06* | (2006.01) | |

(52) U.S. Cl.
CPC ............. *H02K 5/24* (2013.01); *E06B 9/72* (2013.01); *H02K 7/06* (2013.01); *H02K 2207/03* (2013.01)

(58) Field of Classification Search
CPC .. H02K 5/24; H02K 5/26; H02K 5/04; H02K 5/00; H02K 7/06; H02K 7/061; H02K 2207/03; E06B 9/72

(Continued)

(56) References Cited

U.S. PATENT DOCUMENTS 4,425,523 A * 1/1984 Detinko ................. H02K 1/185
310/433
6,979,962 B2 12/2005 Cavarec et al.

(Continued)

FOREIGN PATENT DOCUMENTS

CN 103890303 A 6/2014
CN 105556166 A 5/2016

(Continued)

OTHER PUBLICATIONS

International Search Report, dated Apr. 23, 2018, from corresponding PCT application No. PCT/EP2017/081927.

*Primary Examiner* — Michael Andrews
(74) *Attorney, Agent, or Firm* — Nixon & Vanderhye

(57) ABSTRACT

Disclosed is a suspension module for an electric motor inside a tubular casing of an electromechanical actuator, intended for a closure or sun protection system and including a monobloc suspension member. The suspension member extends along a longitudinal axis intended to be aligned with a rotation axis of a rotor of the electric motor. The suspension member includes multiple circular plates disposed perpendicularly to the longitudinal axis and adjacent to one another along the length of the axis, including at least one intermediate circular plate. Each intermediate circular (Continued)

Figure 1:
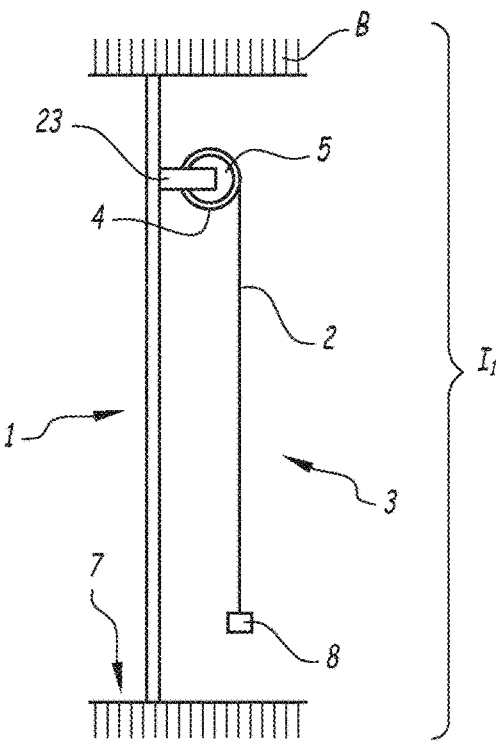

plate is connected to each of the two plates adjacent thereto by at least three connection points.

20 Claims, 10 Drawing Sheets

(58) Field of Classification Search
USPC .......................................... 310/51, 423, 431
See application file for complete search history.

(56) References Cited

U.S. PATENT DOCUMENTS

| | | |
|---|---|---|
| 2005/0206334 A1 | 9/2005 | Cavarec et al. |
| 2011/0005694 A1 | 1/2011 | Ng |
| 2016/0124418 A1* | 5/2016 | Lagarde ............... G05B 19/404 318/630 |
| 2016/0312530 A1 | 10/2016 | Mullet et al. |

FOREIGN PATENT DOCUMENTS

| | | |
|---|---|---|
| CN | 106089004 A | 11/2016 |
| CN | 106090077 A | 11/2016 |
| EP | 1727959 A1 | 6/2006 |
| EP | 1727959 B1 | 1/2008 |
| JP | 2007-529981 A | 10/2007 |
| WO | 2005/090736 A1 | 9/2005 |

* cited by examiner

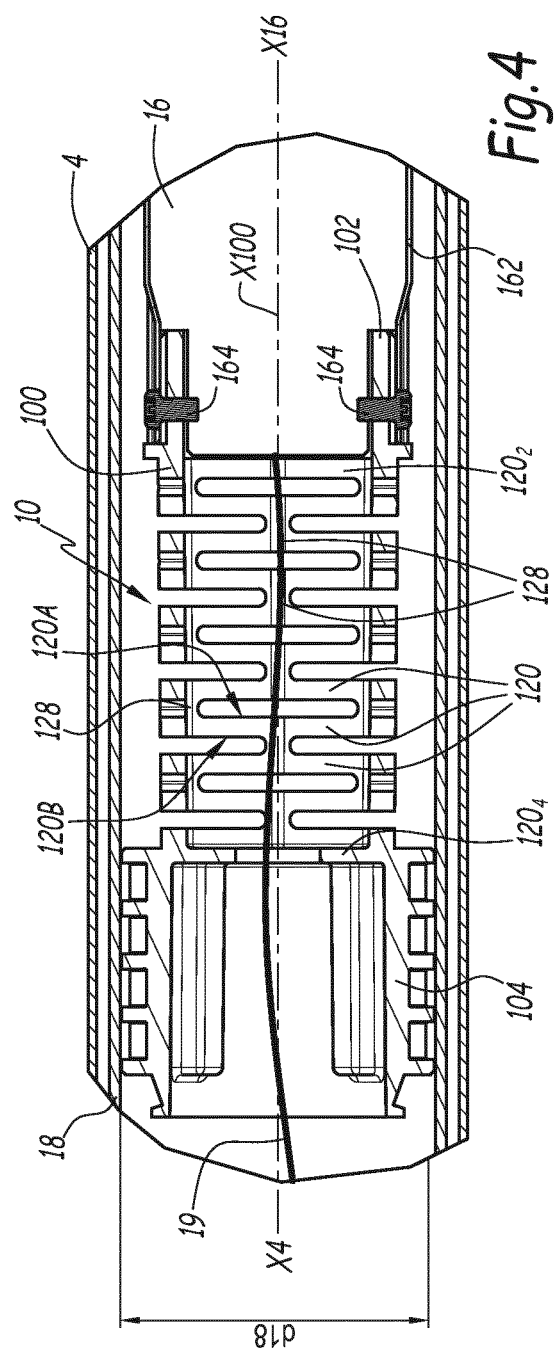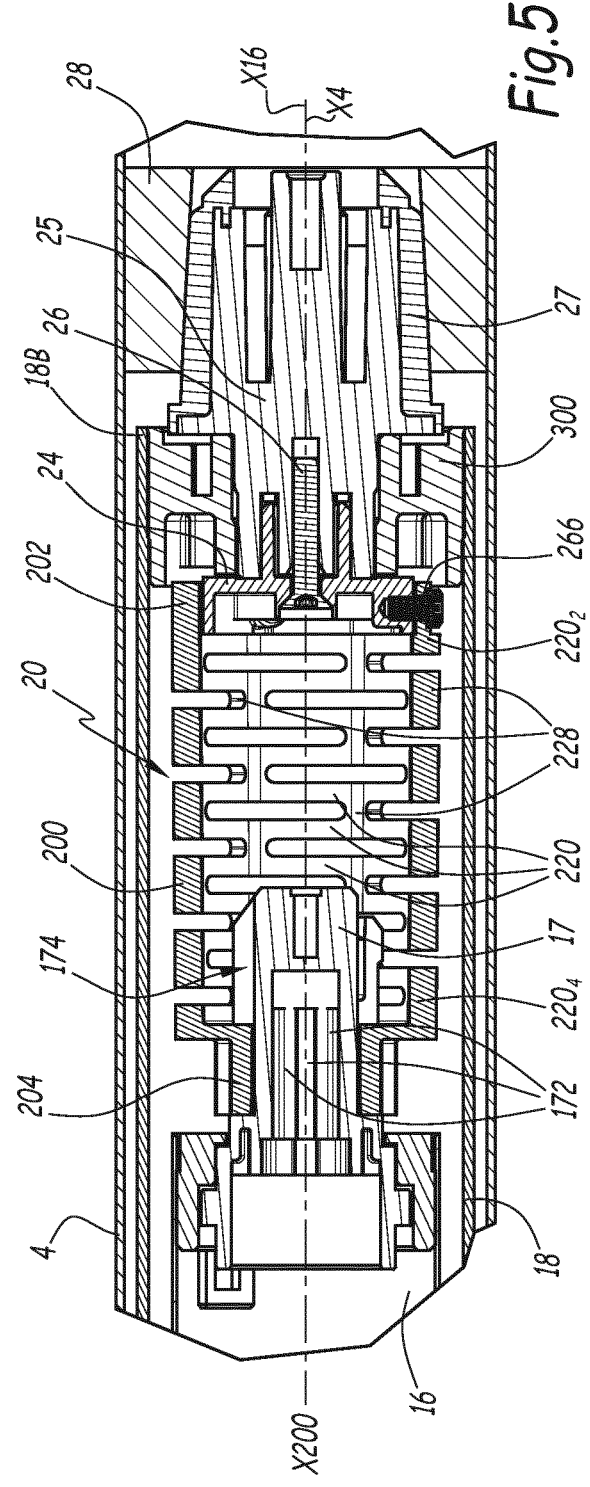

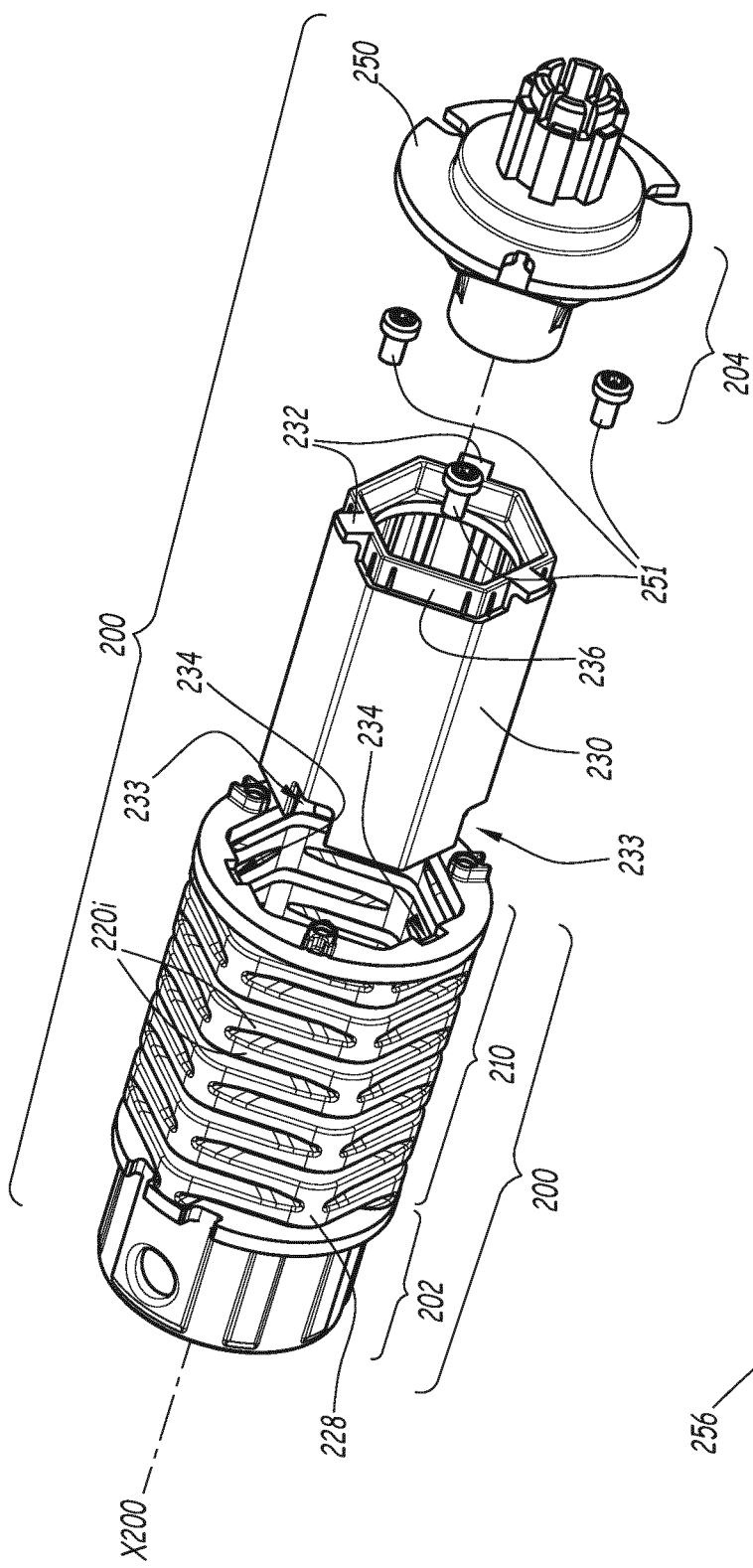
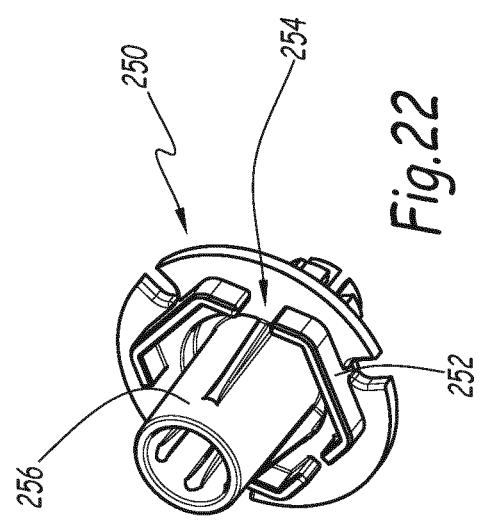

SUSPENSION MODULE, ELECTROMECHANICAL ACUTATOR COMPRISING SUCH A SUSPENSION MODULE, AND CLOSURE OR SUN PROTECTION SYSTEM COMPRISING SUCH A SUSPENSION MODULE OR SUCH AN ELECTROMECHANICAL ACTUATOR

The invention relates to a suspension module for an electric motor inside a tubular casing of an electromechanical actuator, within a closure or sun protection facility.

In the field of closure or sun protection facilities, it is known to produce an electrical actuator by inserting electric motor, most often of the geared motor type, inside a tubular casing. Such an actuator is intended to be mounted inside a winding tube of a roller screen, within a closure or sun protection facility.

Such a screen can for example be a blind, a rolling shutter or a grate.

During operation, an electric motor generates vibrations that can be transmitted to elements that surround the electric motor, in particular the tubular casing and/or the winding tube, which generates noise when the closure or sun protection facility operates.

To make up for this problem, it is known from EP-B-1, 727,959 to use one or several resilient coupling means to absorb vibrations in a longitudinal direction, while withstanding torsion under the effect of a torque, which makes it possible to position the electric motor correctly relative to its environment. However, this solution is only partially satisfactory, since the known suspension modules find it difficult to meet a double requirement, namely having a relatively significantly torsional stiffness, allowing a good transmission of torque around the rotation axis of the rotor of the electric motor, and having a shear and flexural flexibility to guarantee mechanical separation between the motor and its environment, in order to limit the propagation of the vibrations from this motor.

In the known resilient coupling means, it is possible to use cylinders made from synthetic materials, in particular polyurethane, to fix a motor relative to a casing. These cylinders made from synthetic materials have limited torque transmission capabilities. Increasing their stiffness incurs a risk of deteriorating the noise filtration performance. Furthermore, such cylinders made from synthetic material are difficult to produce in large series and to assemble, and are the source of significant production flaws.

It is also known to damp the vibrations coming from the motor by using parts made from viscoelastic material. The viscoelastic materials in fact introduce damping due to the inherent nature of the material. They are susceptible to substantial flow, which creates problems in terms of the definition of the travel end limits of an actuator, or even oscillations of the load bar of a screen. Furthermore, the vibro-acoustic performance of these viscoelastic materials tends to deteriorate over time.

The invention aims to resolve these problems by proposing a new suspension module that has a sufficient rigidity or torsional stiffness to allow an electric motor to be interlocked in rotation with a complementary element, while being flexible enough, in particular in shear and/or flexion, to greatly limit the transmission of vibrations, therefore noise, of the electric motor toward its environment.

To that end, the invention relates to a suspension module for an electric motor inside a tubular casing of an electromechanical actuator for a closure or sun protection facility, comprising a single-piece suspension member, extending along a longitudinal axis intended to be aligned on a rotation axis of a rotor of the electric motor. According to the invention, this suspension member comprises several annular plates arranged perpendicular to the longitudinal axis and juxtaposed along this axis, including at least one intermediate annular plate, while each intermediate annular plate is connected to each of the two plates that are adjacent to it, by at least three connection bridges.

Owing to the invention, the three connection bridges that connect each intermediate annular plate to the adjacent plates make it possible to distribute the torsion forces applied on the suspension member during torque transmission. This gives the suspension member of the invention good torsional stiffness and better distribution of the torque to be transmitted than the coupling means of the prior art. Furthermore, the three connection bridges that are situated on each side of each plate constitute bearing points that allow the plates to deform resiliently, which gives the suspension member of the invention a high level of flexibility in flexion and/or shear. Flexion refers to a deformation by rotation of one end of the suspension member relative to the other around a direction perpendicular to its longitudinal axis. Shear refers to a deformation of the suspension member by translation along a direction perpendicular to its longitudinal axis. The structure of the suspension member with annular plates juxtaposed along its longitudinal axis also makes it possible to limit the transmission of vibrations along a direction parallel to this axis.

Using at least three connection bridges on each side of each annular plate makes it possible to minimize the thickness of these annular plates both along a radial direction and a direction parallel to the longitudinal axis, which makes it possible to decrease the material cost of the suspension member. The invention makes it possible to obtain the best compromise between the resistance to torque and the stiffness in flexion and shear while also obtaining a part that is easy to produce, in particular by injection. The division by three of the torsion forces at each bridge, due to the distribution of these bridges on the perimeter of an annular plate, causes shorter plate sections, or branches, which in principle is a disadvantage for flexion. However, the design of the branches, for example the fact that they are rectilinear rather than circular, their adapted dimensioning, can greatly offset this disadvantage.

Owing to the structure considered for the suspension member of the invention, the latter can be made by injection in a material not filled with glass fibers, i.e., using a well-controlled and cost-effective manufacturing method.

According to advantageous but optional aspects of the invention, such a suspension member may incorporate one or several of the following features, considered in any technically allowable combination:

- Each connection bridge forms a bearing point allowing the plates, in particular the plate sections on either side of this bearing point, to deform when flexion and shear forces are applied to the suspension member.
- The connection bridges located on a first axial face of an intermediate annular plate are angularly offset, around the longitudinal axis, relative to the connection bridges located on a second axial face of the same annular plate, opposite the first axial face.
- On each axial face of an intermediate annular plate, the connection bridges are regularly distributed around the longitudinal axis.
- Each axial face of an intermediate annular plate is equipped with three connection bridges distributed at 120° around the longitudinal axis, while two connection bridges arranged on the two opposite axial faces of this intermediate annular plate are angularly offset by 60° or 180° around the longitudinal axis.

Each annular plate is formed by a series of beams, preferably rectilinear, while each connection bridge is arranged at the junction between two adjacent beams on the circumference of the annular plate.

At least some of the beams of an annular plate work in compression when the suspension member undergoes a torsional force around its longitudinal axis, thus allowing the passage of torque.

At least one beam of a pair of two adjacent beams works in flexion around a connection bridge, which guarantees the flexibility of the suspension member and contains the vibrations inside the suspension member.

The thickness of an intermediate plate, measured parallel to the longitudinal axis, increases as it approaches a connection bridge.

The suspension module comprises a polygonal tube arranged inside the intermediate plate(s) of the suspension member, this polygonal tube being configured to transmit a torque between two end portions of the suspension module, this polygonal tube preferably being equipped with inner stiffening ribs.

The polygonal tube and an intermediate portion of the suspension member, which includes the plates, are provided with members for blocking their relative rotation around the longitudinal axis, preferably in the form of complementary reliefs engaged by shape cooperation.

The suspension module comprises an end piece attached on the intermediate portion, while the blocking members provided on the polygonal tube are locked, axially and in rotation, in corresponding housings of the intermediate portion when the endpiece is in place on the intermediate portion.

When the end piece is set on the intermediate portion, a skirt of this end piece radially surrounds a portion of the polygonal tube and fits in an inner polygonal section of the intermediate portion.

The suspension module comprises, at a first axial end portion, an interface for interlocking, in rotation around the longitudinal axis, with a stationary part of the motor and, at a second axial end portion opposite the first end portion, an interface for centering and immobilization in the tubular casing.

The suspension module comprises, at a first axial end portion, an interface for interlocking, in rotation around the longitudinal axis, with an output shaft of the actuator and, at a second end portion opposite the first end portion, an interface for interlocking, in rotation around the longitudinal axis, with an output shaft of the electric motor.

The intermediate annular plates and the connection bridges are arranged in an intermediate portion of the suspension module situated, along the longitudinal axis, between the first end portion and the second end portion.

According to another aspect, the invention relates to an electromechanical actuator for a closure or sun protection facility, this actuator comprising an electric motor mounted inside a tubular casing. According to the invention, this electric motor is suspended in this tubular casing using at least one suspension module as mentioned above. Such an electromechanical actuator is more robust and less noisy than those of the state of the art.

Advantageously, the electric motor is suspended in the tubular casing using a first suspension module as mentioned above, which couples a stationary part of the motor in rotation with the tubular casing, and a second suspension module as mentioned above, which couples an output shaft of the electric motor in rotation with an output shaft of the actuator.

In this case, it is possible to provide that the suspension members of the two suspension modules are identical and each associated with a first specific end piece.

According to still another aspect of the invention, the latter relates to a closure or sun protection facility that comprises a suspension module as mentioned above and/or an electromechanical actuator as mentioned above.

Figure 2:
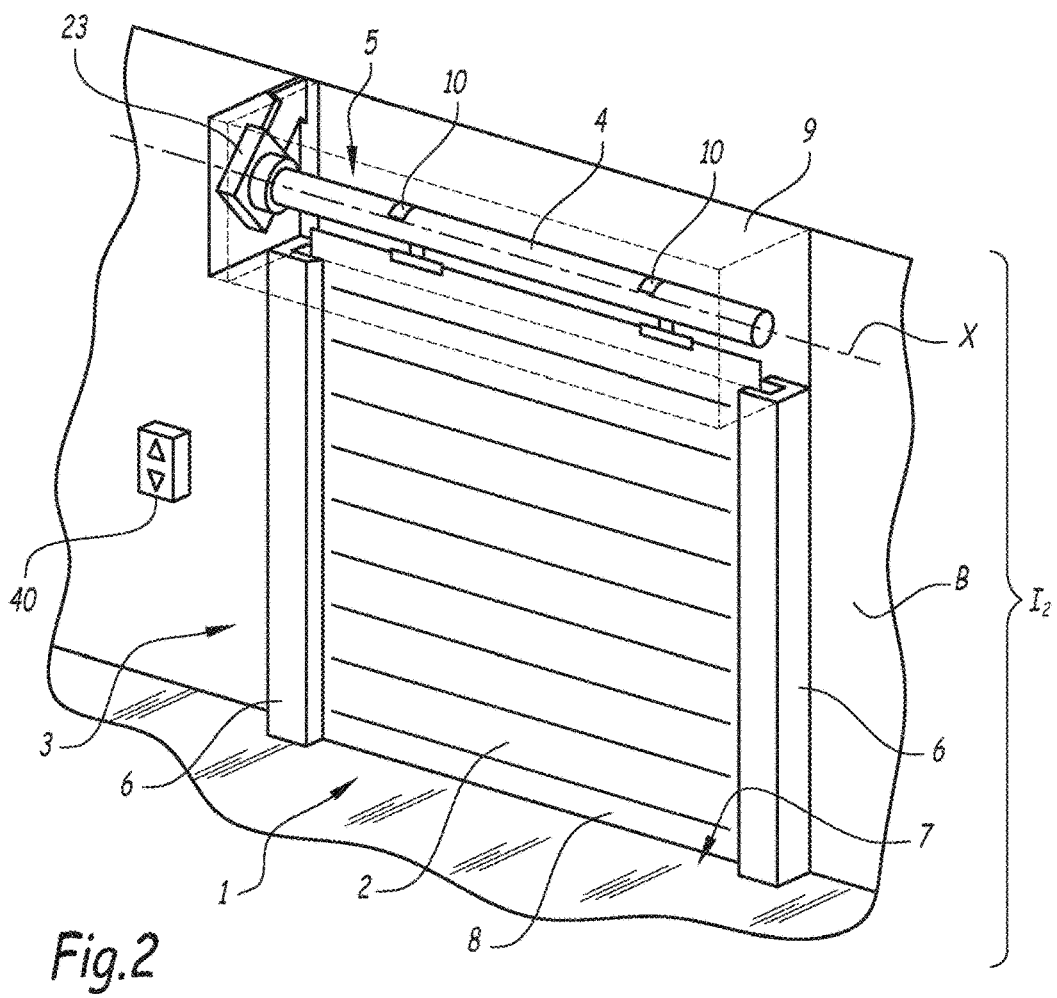
Figure 3:
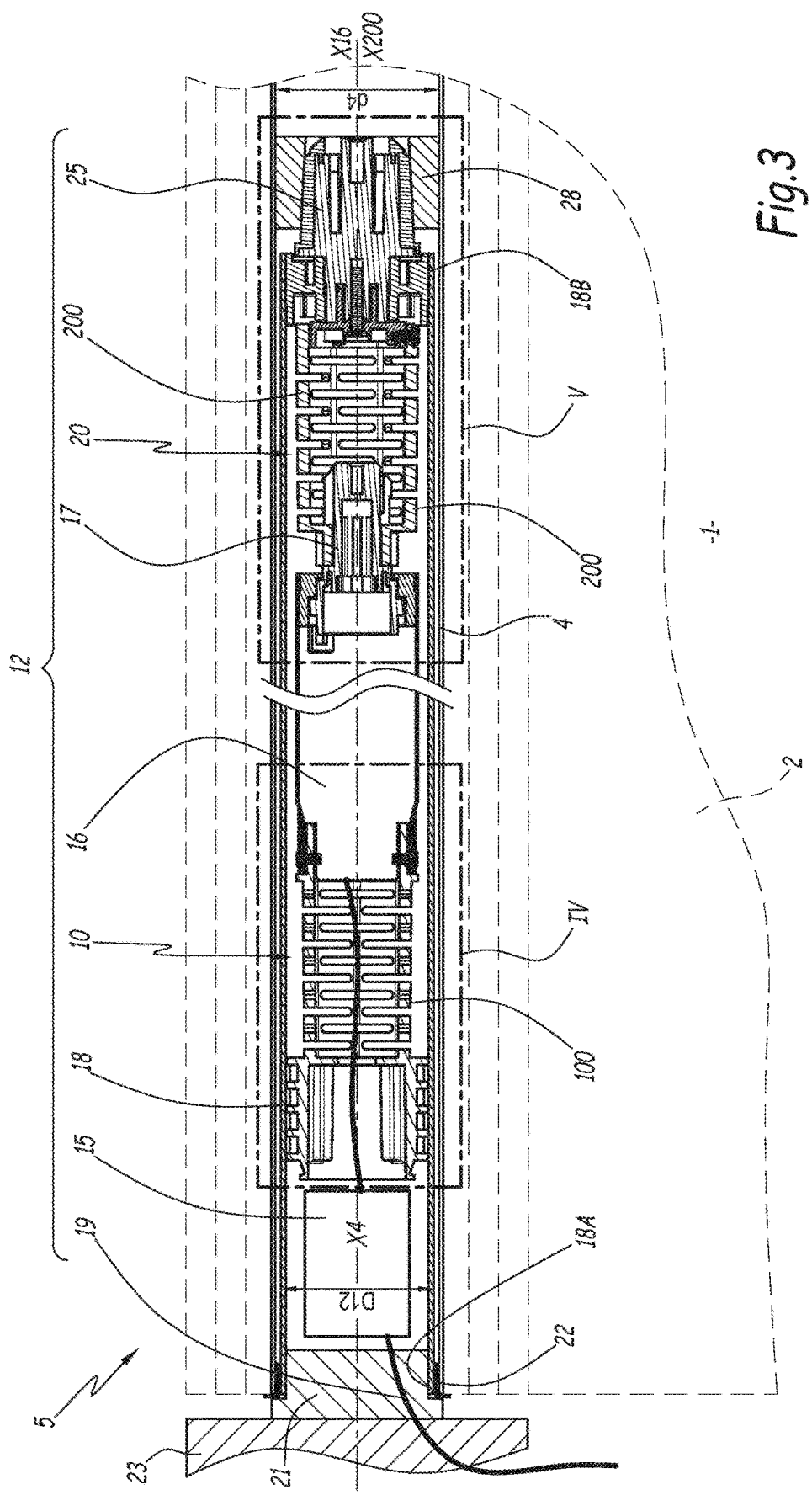
Figure 6:
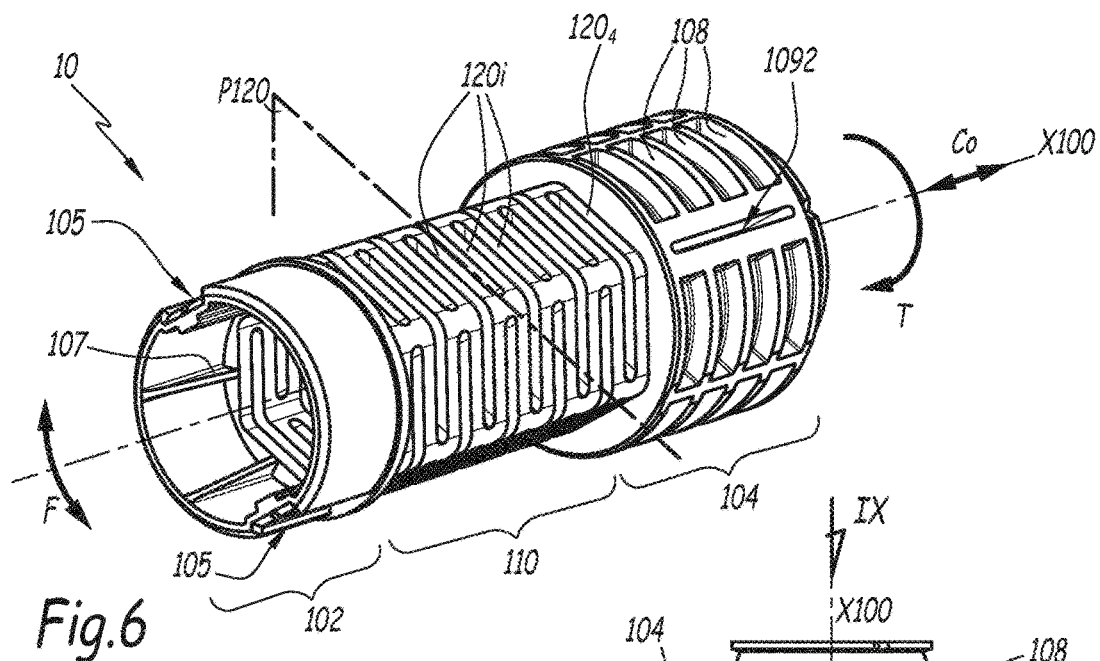
Figure 7:
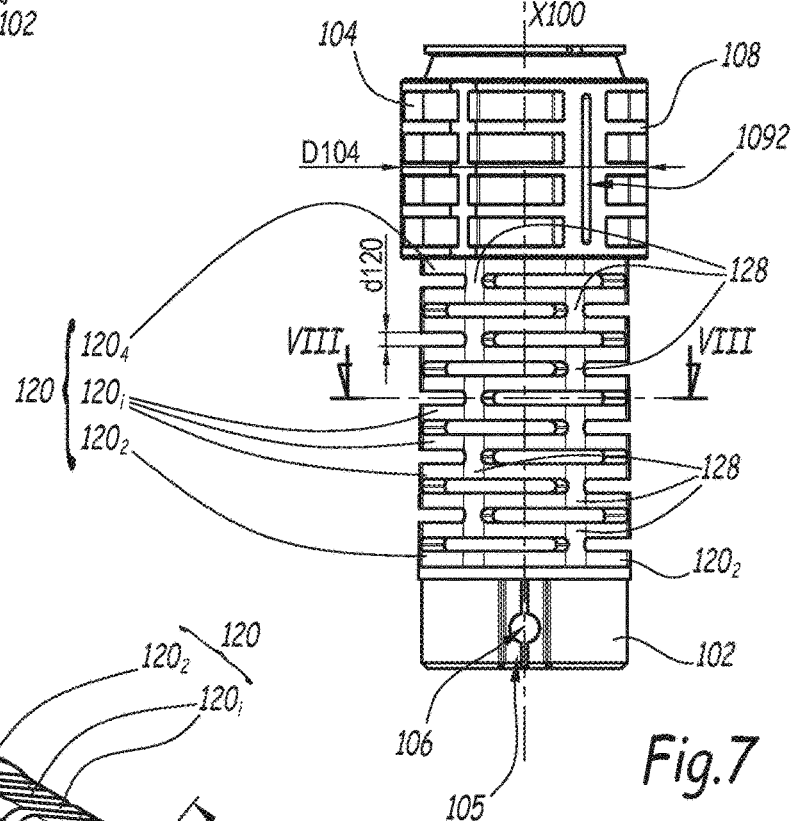
Figure 8:
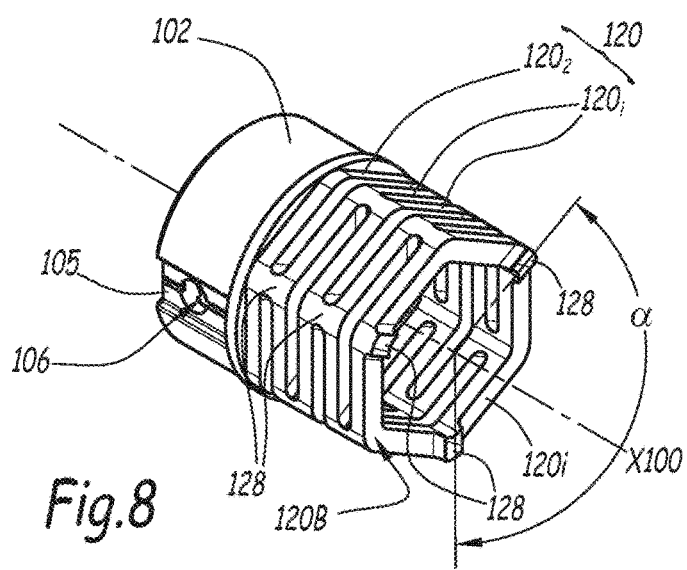
Figure 9:
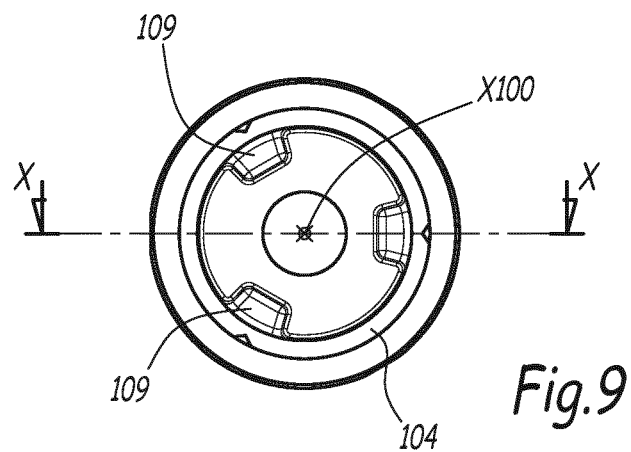
Figure 10:
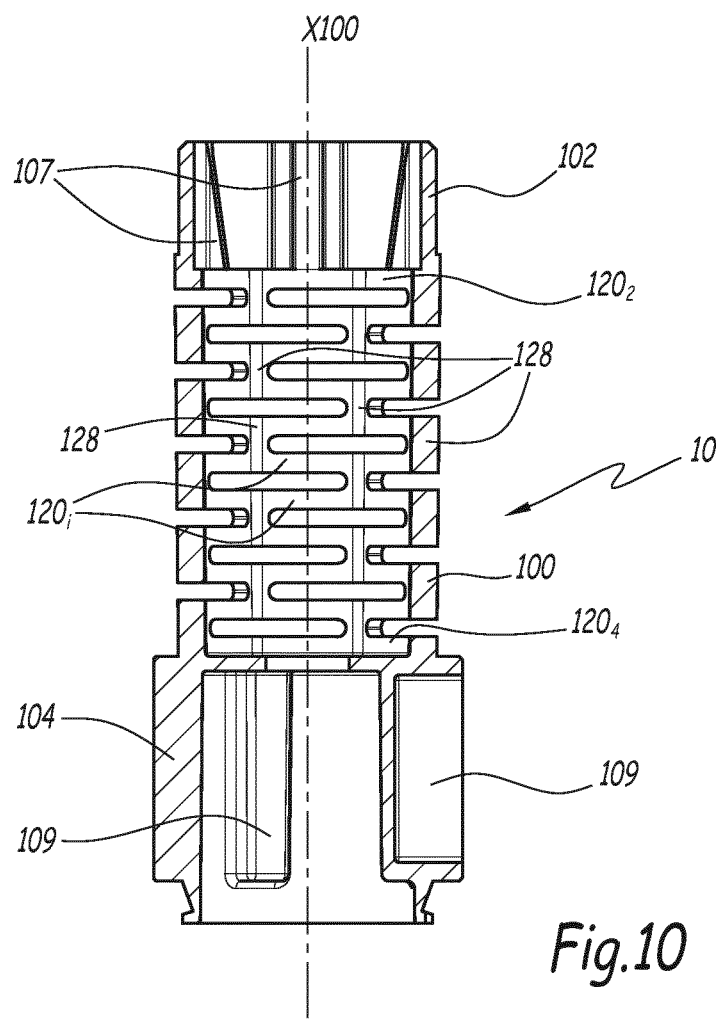
Figure 11:
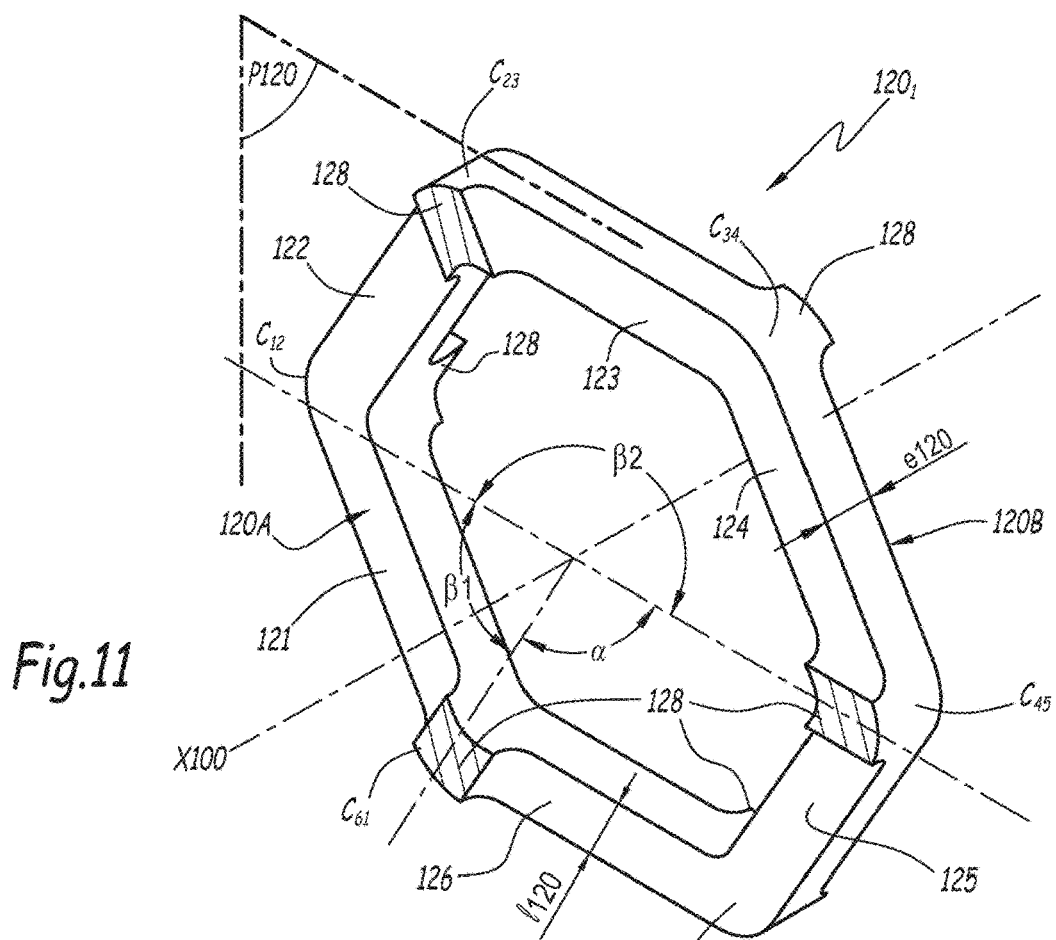
Figure 12:
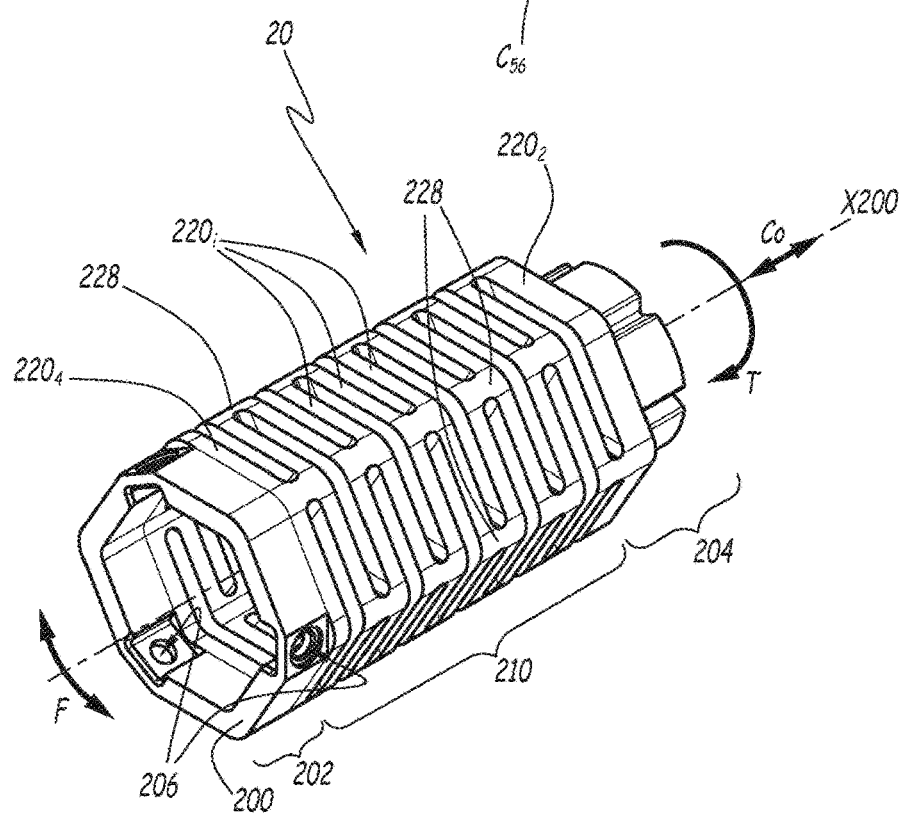
Figure 13:
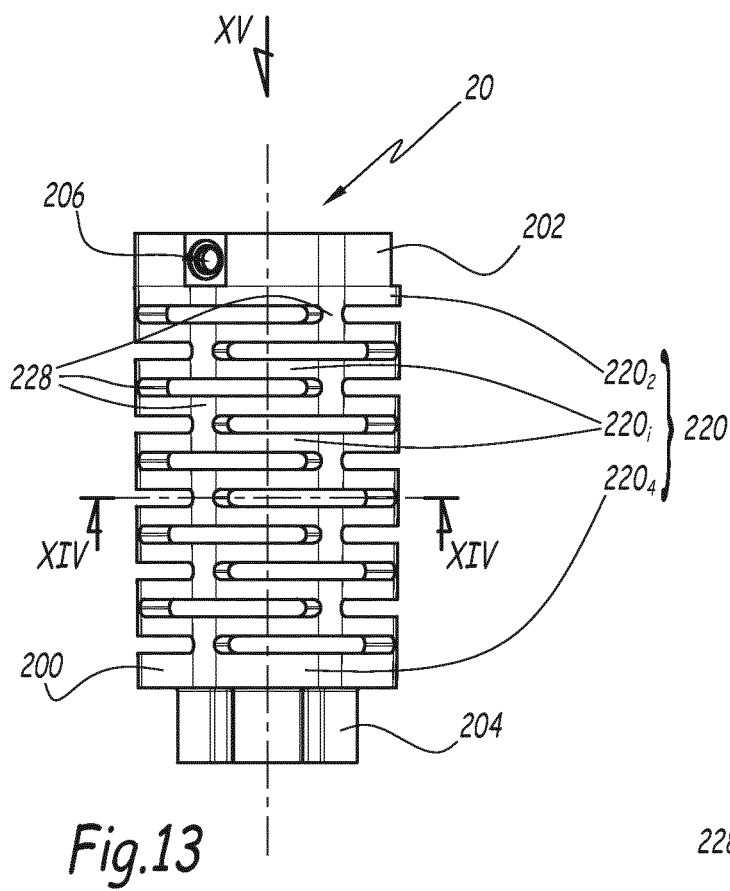
Figure 14:
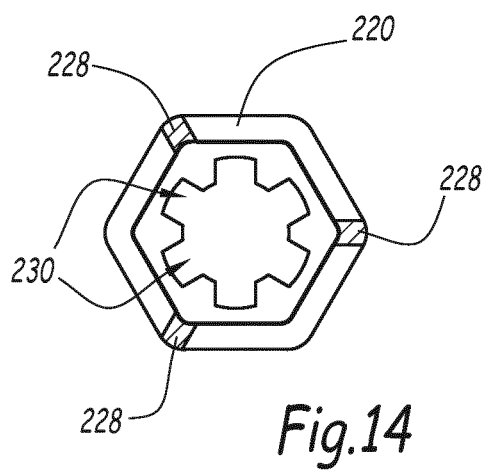
Figure 15:
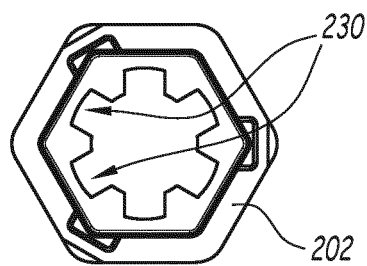
Figure 16:
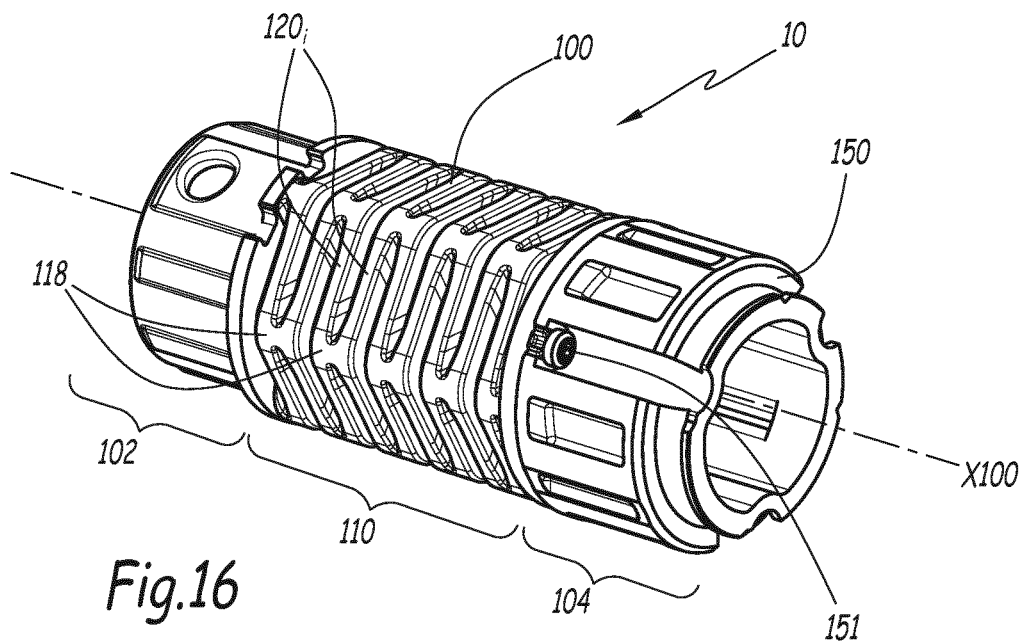
Figure 17:
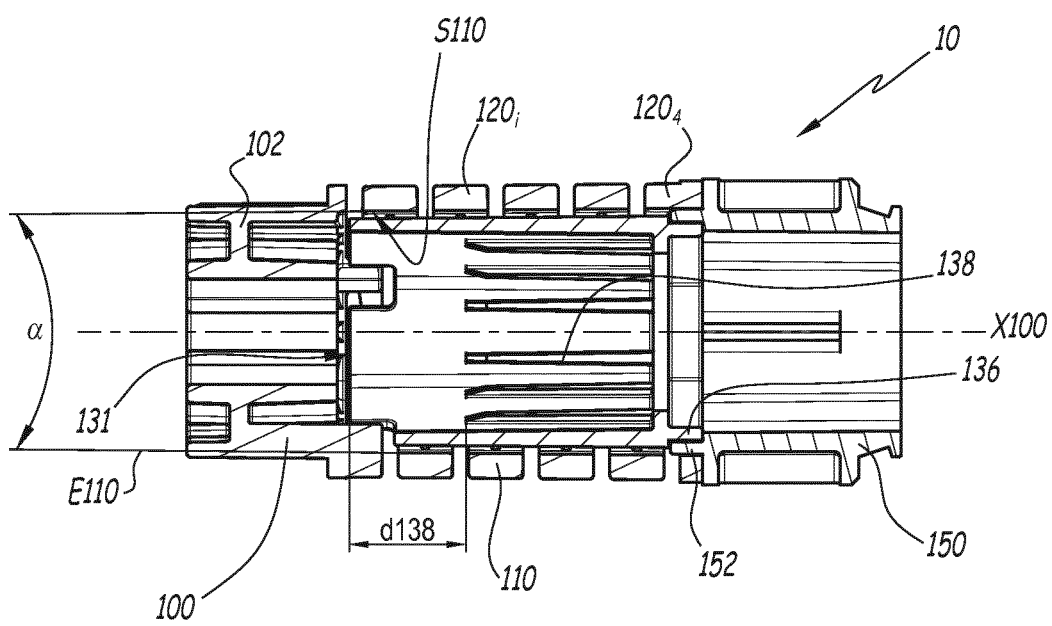
Figure 18:
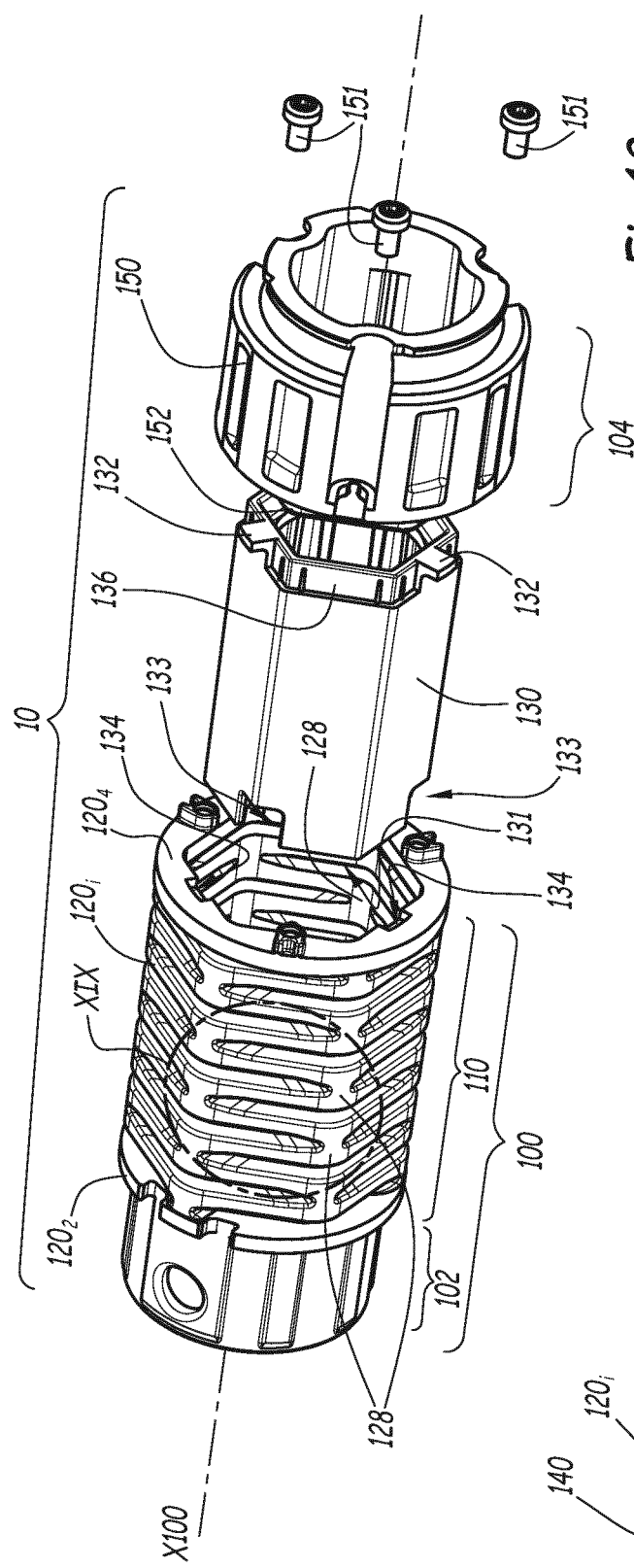
Figure 20:
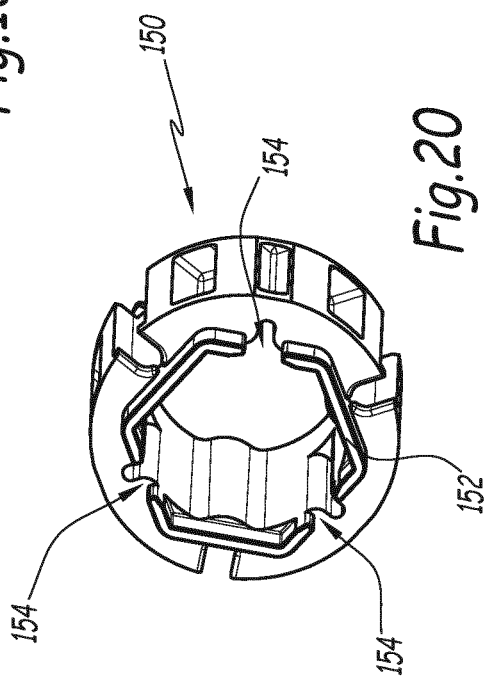
Figure 19:
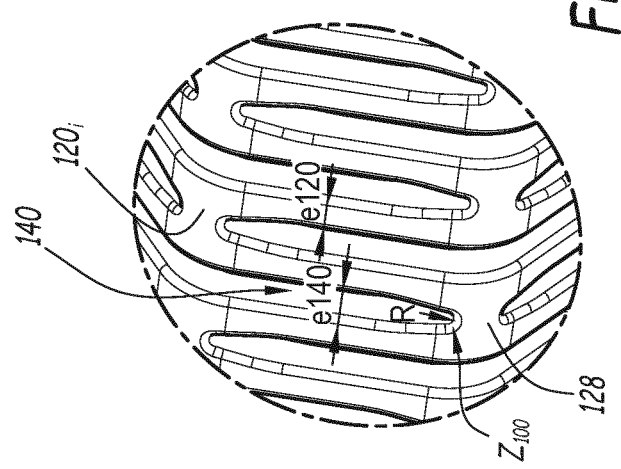

The invention will be better understood and other advantages thereof will appear more clearly in light of the following description of two embodiments of a suspension module, one embodiment of an electric actuator and three embodiments of a facility according to its principle, provided solely as an example and done in reference to the appended drawings, in which:

FIG. 1 is a cross-sectional block diagram of a sun protection facility according to a first embodiment of the invention and comprising a roller blind, FIG. 2 is a schematic perspective view of a closure facility according to a second embodiment of the invention and comprising a rolling shutter, FIG. 3 is a longitudinal schematic sectional view of a winding tube belonging to one of the facilities of FIGS. 1 and 2 and comprising an electromechanical actuator according to the invention, FIG. 4 is an enlarged view of detail IV in FIG. 3, FIG. 5 is a larger scale view of detail V in FIG. 3, FIG. 6 is a perspective view of a suspension module used in the part of the electromechanical actuator shown in FIG. 4, FIG. 7 is a side view of the suspension module of FIG. 6, FIG. 8 is a perspective sectional view along line VIII-VIII in FIG. 7, FIG. 9 is an end view in the direction of arrow IX in FIG. 7, FIG. 10 is a sectional view along line X-X in FIG. 9, FIG. 11 is a perspective view of an annular plate belonging to the suspension module of FIGS. 6 to 10, according to the orientation of FIG. 6 and enlarged, FIG. 12 is a perspective view of a suspension module used in the part of the electromechanical actuator shown in FIG. 5, FIG. 13 is a side view of the suspension module of FIG. 12, FIG. 14 is a sectional view along line XIV-XIV in FIG. 13, FIG. 15 is an end view in the direction of arrow XV in FIG. 13, FIG. 16 is a perspective view, comparable to FIG. 6, for a suspension module according to another embodiment of the invention, FIG. 17 is an axial sectional view of the suspension module of FIG. 16, FIG. 18 is an exploded perspective view of the suspension module of FIGS. 16 and 17, FIG. 19 is an enlarged view of detail 19 in FIG. 18, FIG. 20 is an exploded perspective view from another angle of an end piece of the suspension module of FIGS. 16 to 19, FIG. 21 is a view similar to FIG. 18, for a suspension module according to another embodiment of the invention, and FIG. 22 is a view similar to FIG. 20 for an end piece of the suspension module of FIG. 21.

In reference to FIGS. 1 and 2, we will first describe two automation facilities I₁ and I₂ according to the invention and each installed in a building B comprising an opening 1, window or door, equipped with a screen 2 belonging to a blackout device 3, in particular a motor-driven blind or a motor-driven shutter.

The blackout device 3 may be a blind, in particular made from fabric, that is able to be wound, as shown in FIG. 1, a creased or slatted blind, in which case the facility I₁ is a sun protection facility, or a shutter, as shown in FIG. 2, or a grate, in which case the facility I₂ is a closure facility.

In the first embodiment illustrated in FIG. 1, the screen 2 of the blackout device 3 is wound on a winding tube 4 driven by a motor-based driving device 5. The screen 2 is movable between a wound position, in particular an upper position, and an unwound position, in particular a lower position. The blackout device 3 comprises a support 23 of the screen 2, as well as the winding tube 4 for winding the screen 2.

In a known manner, the winding blind of the blackout device 3 includes a fabric, forming the screen 2 of the winding blind 3. A first end of the screen 2, in particular the upper end of the screen 2 in the assembled configuration of the blackout device 3 in the home automation facility I₁, is fastened to the winding tube 4. Additionally, a second end of the screen 2, in particular the lower end of the screen 2 in the assembled configuration of the blackout device 3 in the home automation facility I₁, is fastened to a load bar 8, the weight of which exerts tension on the screen 2. In FIG. 1, the fabric forming the screen 2 is made from a textile material.

In a known manner, the first end of the screen 2 is fastened to the winding tube 4, in particular over the entire length of the winding tube 4, so as to be able to wind and unwind the screen 2 around the winding tube 4.

In the case of a roller blind, the high wound position corresponds to a predetermined high end-of-travel position, or to the load bar 8 of the screen 2 starting to rest against the support 23 of the screen 2 of the roller blind 3, and the low unwound position corresponds to a predetermined low end-of-travel position, or to the the load bar 8 of the screen 2 starting to rest against a sill 7 of the opening 1, or to complete unwinding of the screen 2. The facility I₁ shown in FIG. 1 does not include a housing and the fabric forming the screen 2, wound on the winding tube 4, is visible.

In the second embodiment illustrated in FIG. 2, the screen 2 belongs to a rolling shutter 3 that comprises an apron comprising horizontal slats articulated on one another, forming the screen 2 of the rolling shutter 3, and guided by two lateral guideways 6. These slats are joined when the screen 2 reaches its unwound lower position. The upper slat of the screen 2 is attached to the winding tube 4 by two fasteners 10.

In this case, the wound upper position corresponds to the bearing of a final L-shaped end slat 8 of the apron 2 of the rolling shutter 3 against an edge of a housing 9 of the rolling shutter 3, while the unwound lower position corresponds to the bearing of the final end slat 8 of the apron 2 of the rolling shutter 3 against a threshold 7 of the opening 1.

The winding tube 4 is positioned inside the housing 9 of the rolling shutter 3. The apron 2 winds and unwinds around the winding tube 4 and is housed at least partially inside the housing 9. In general, the housing 9 is positioned above the opening 1, or in the upper part of the opening 1. The housing 9 is an integral part of the holding device of the screen 2.

The motor-based driving device 5 is controlled by a control unit 40. The control unit 40 may for example be a local control unit, as shown in FIG. 2, or a central control unit, not shown. The central control unit optionally drives the local control unit, as well as other similar local control units distributed throughout the building B.

The central control unit can be in communication with a weather station, inside or outside the building B, in particular including one or more sensors that can be configured for example to determine a temperature, brightness, or wind speed in the case of an outside weather station.

A comparable control unit, not shown, is used in the first embodiment.

In FIG. 2, only one screen support 23 is shown. In practice, the facility I₂ preferably comprises a screen support 23 at each end of the winding tube 4.

The motor-based driving device 5 is preferably configured to carry out the unwinding or winding commands of the screen 2 of the blackout device 3, which may in particular be acquired by a local or central control unit.

FIG. 3 is a cross-sectional view of a motor-based driving device 5 that can be either that of the facility of FIG. 1, or that of the facility of FIG. 2. This motor-based driving device 5 comprises an electromechanical actuator 12, of the tubular type, making it possible to set the winding tube 4 in rotation so as to unwind or wind the screen 2 of the blackout device 3. In the mounted state, the electromechanical actuator 12 is inserted into the winding tube 4. To that end, the inner diameter d4 of the winding tube 4 is substantially larger than the outer diameter D12 of the electromechanical actuator 12, such that the electromechanical actuator 12 can be inserted into the winding tube 4 during the assembly of the blackout device 3.

According to another embodiment, the electromechanical actuator incorporates a cylindrical electric motor, but it is inserted in a rail with a square or rectangular section, opened on one side. The casing of the actuator can be cylindrical or have a square or rectangular section similar to the section of the rail. The actuator then drives a drive rod on which cords for deploying the screen are wound.

The electromechanical actuator 12 comprises an electric motor 16. The electric motor 16 comprises a rotor and a stator, not shown and positioned coaxially around a rotation axis X16, which is combined with the rotation axis X4 of the winding tube 4 in the assembled configuration of the motor-based driving device 5. In practice, the electric motor 16 can be a geared motor that includes a reduction gear and a brake, which are not shown but are generally known. The output shaft 17 of the electric motor 16 is visible in FIGS. 3 and 5, It is provided with inner splines 172 intended to cooperate with outer reliefs of a drive shaft of the electric motor 16, coupled to the rotor, the brake or the reduction gear. This output shaft 17 is also provided with outer splines 174.

The electromechanical actuator 12 also comprises a tubular casing 18, with a circular section centered on the axis X16. The casing 18 can be made from metal or a synthetic material. The outer diameter D12 of the actuator 12 is, in practice, equal to that of the tubular casing 18.

The tubular casing 18 is immobilized relative to the support member 23 using a head 21 that closes off a first end 18A of the casing 18. A bearing 22 inserted between the casing 18 and the winding shaft 4 allows this shaft to rotate around the axis X4, while the actuator 12 remains stationary relative to the support member 23.

Control means for controlling the electromechanical actuator 12, making it possible to move the screen 2 of the blackout device 3, comprise at least one electronic control unit 15. This electronic control unit 15 is able to operate the electric motor 16 of the electromechanical actuator 12, and in particular to allow the supply of electricity for the electric motor 16.

Thus, the electronic control unit 15 in particular controls the electric motor 16, so as to open or close the screen 2, as previously described.

The electronic control unit 15 in particular comprises a command receiving module, not shown, for receiving command orders, the command orders being sent by a command transmitter, such as the remote control 40. Preferably, the command receiving module of the electronic control unit 15 is of the wireless type. In particular, this module is configured to receive wireless commands. The command receiving module can also allow the reception of commands sent by wired means.

The control means of the electromechanical actuator 12 comprise hardware and/or software means. As one non-limiting example, the hardware means may comprise at least one microcontroller.

Here, the electromechanical actuator 12 comprises an electrical energy supply cable 19 making it possible to supply electricity from the power mains or from one or several batteries, not shown, through the support 23 and the head 21. Alternatively or additionally, batteries or cells are integrated inside the casing 18 of the electromagnetic actuator 12.

The electric motor 16 is suspended inside the casing 17 using a first suspension module 10 more particularly visible in FIGS. 4 and 6 to 11 and a second suspension module 20 more particularly visible in FIGS. 5 and 12 to 15.

The first suspension module 10 is provided to cooperate, on the one hand, with a stationary sheath tube 162 of the electric motor 16. This sheath tube 162 is interlocked, in rotation around the axis X16, with the stator of the electric motor 16. The first suspension module 10 is provided to cooperate, on the other hand, with the casing 18. The first suspension module 10 comprises a suspension member 100. The second suspension module 20 comprises a suspension member 200.

The suspension member 100 extends along a longitudinal axis X100 that is superimposed on the axis X16 in the non-mounted configuration of the electromechanical actuator 12 in the winding tube 4. The suspension member 100 extends, along the axis X100, between a first end portion 102 and a second end portion 104. The first end portion 102 has a tubular outer shape with a globally circular section over most of its circumference and has two slots 105 each provided with a passage orifice 106 for a screw 164 securing the first end portion 102 to the sheath tube 162. An interface for securing elements 100 and 162 in rotation around the axes X16 and X100 is thus created by the orifices 106, This interface can, in a variant, take another shape, in particular zones of the elements 100 and 162 intended to be glued on one another.

On the inside, the first end portion 102 is provided with inner ribs 107, the height of which increases along the axis X100 toward the second end portion 104 and which is intended to mechanically reinforce the suspension member 100.

The second end portion 104 of the suspension member 100 has a circular outer shape centered on the axis X100 with a diameter D104 in particular defined at circumferential ribs 108 of the second end portion 104. This diameter D104 is equal to the inner diameter d18 of the casing 18. The geometry of the second end portion 104 has no impact on the operation or the connection of the suspension member. The illustrated ribs are only the result of material removal for the production of the suspension member by injection.

The second end portion 104 also comprises three hollow compartments 109 that are accessible, radially to the axis X100, from the outside, through slits 1092 and that serve to form a receiving space for pins, not shown, for fastening the suspension member to the casing 18 of the actuator 12.

Between the end portions 102 and 104, the suspension member 100 comprises an intermediate portion 110 that is formed by a series of flat annular plates 120. Each annular plate 120 is flat in that it extends along a main plane P120 perpendicular to the axis X100. Its thickness e120 is measured parallel to the axis X100 and is at least five times smaller than the maximum dimension of the annular plate measured in the main plane P120.

In practice, as shown more particularly in FIG. 11, an annular plate 120 is made up of six rectilinear branches 121, 122, 123, 124, 125, 126 forming a regular hexagon with rounded corners.

As in particular emerges from FIGS. 6, 7, 8 and 10, three types of plate 120 must be considered. A first end plate $120_2$ is alongside the first end portion 102. A second end plate $120_4$ is alongside the second end portion 104. The other plates make up intermediate plates $120_i$ that are each arranged, along the axis X100, between two other plates 120.

References 120A and 120B denotes the two opposite axial faces of an intermediate annular plate 120. An axial face of the plate $120_i$ is a face of this plate that is perpendicular to the axis X100. Considering that the plate $120_i$ visible in FIGS. 8 and 11 is the same, the face 120A of this plate 120 facing the first end portion 102 is visible in FIG. 11, while its face 120B facing the second end portion 104 is visible in FIG. 8.

Each intermediate plate $120_i$ is connected to the two adjacent plates $120_2$, $120_4$ or $120_i$ by three connecting bridges 128. Each connecting bridge 128 is made up of a quantity of material that connects two adjacent annular plates 120 and that is in a single piece with these plates. Indeed, the suspension member 100 is, as a whole, made in one piece, such that the connecting bridges 128 are, inter alia, in one piece with the other parts of the suspension member 100.

On the side of the axial face 120A, the connection between each intermediate annular plate $120_i$ and the adjacent plate is rigid in torsion around the axis X100 because the torsion forces are distributed around the axis X100 between the three connecting bridges 128. Likewise, on the side of the face 120B of each intermediate plate $120_i$, a torsion force is distributed between the three bridges 128.

Furthermore, a torsion force T around the axis X100, applied on the suspension member 100 between the end portions 102 and 104, is distributed on the multiple connections made between the annular plates 120, at the connecting bridges 128. In the example, the suspension member 100 comprises eleven annular plates 120, including the two end plates $120_2$ and $120_4$ and nine intermediate plates $120_i$. In practice, the number of intermediate plates can be between 1 and 15, preferably between 5 and 12.

Thus, the suspension member 100 is rigid in a torsion direction around the axis X100, represented by the arrow T in FIG. 6. Once immobilized in the tubular casing 18, the suspension member 100 can therefore constitute a stationary reference point for the electric motor 16. In other words, the suspension member 100 makes it possible to react a torque exerted by the motor 16 inside the tubular casing 18.

Furthermore, the structure of the suspension member 100 gives it a relatively high flexibility in a flexion direction perpendicular to the axis X100, represented by the double arrow F in FIG. 6. Indeed, the connection bridges 128 form as many bearing points allowing the plates, in particular the plate sections on either side of the bearing point, to deform when flexion and shear forces are applied to the suspension member 100. The component material of the suspension member 100 does not have to be viscoelastic. It can in particular be polyacetyl or polyamide, which are stable materials over time and the properties of which do not tend to deteriorate. Furthermore, these materials are relatively inexpensive and make it possible to consider mass production.

It will also be noted that, in the case of a torsional force T exerted around the axis X100 between the end portions 102 and 104, at least some of the branches 121 to 126 work in compression, i.e., in a direction in which these beams are strong. This makes it possible to dimension the cross-sections of each of the branches 121 to 126 optimally, by decreasing their axial thickness e120 and their width l120 measured in the plane P120 perpendicular to their length, i.e., in a direction close to a direction radial to the axis X100, while keeping a relatively significant distance d120, measured parallel to the axis X100 between two adjacent plates 120, which makes it possible to increase the flexibility in flexion or shear of the suspension member 100, without decreasing its torsional stiffness. In other words, the geometry of the plates 120 makes it possible to maximize the diameter of the member 100, while decreasing the traction/compression forces in the branches 121 to 126.

According to one variant of the invention that is not shown, the branches 121 to 126 can be in the shape of an arc of circle, in which case the annular plates 120 are globally circular or oval. The branches 121 and 126 then work both in flexion and compression when the suspension member is subject to a torsion force.

According to one advantageous aspect of the invention, the connection points 128 located on one face 120A of an intermediate annular plate 120$_i$ are angularly offset from the connection points 128 located on its other axial face 120B. In the example, the three connection points 128 arranged on the face 120A are regularly distributed on this face 120A, at 120° around the axis X100, while the same is true for the connection points 128 arranged on the axial face 120B. The connection points 128 arranged on the axial face 120 are arranged on three corners of the hexagon different from the corners on which the connection points 128 are arranged on the axial face 120B. Reference $C_{12}$ denotes the corner of a plate 120$_i$ between its branches 121 and 122, $C_{23}$ the corner of this plate between its branches 123 and 124, $C_{34}$ the corner of this plate between its branches 123 and 124, $C_{45}$ the corner of this plate between its branches 124 and 125, $C_{56}$ the corner of this plate between the branches 125 and 126 and $C_{61}$ the corner of this plate between the branches 126 and 121. On the side of the axial face 120A, the connection points 128 are arranged at the corners $C_{61}$, $C_{23}$ and $C_{45}$, while on the side of the axial face 120B, the connection points 128 are arranged at the corners $C_{12}$, $C_{34}$ and $C_{56}$. Reference α denotes the angular offset angle around the axis X100, between two connection bridges 128 situated on a same axial face 120A or 120B of an intermediate annular plate 120$_i$. In the example, the angle α is equal to 120°. Reference β denotes the offset angle between two connection bridges situated on the two opposite axial faces 120A and 120B. In the example, the angle β can assume two values, namely $β_1$=60° and $β_2$=180°.

This distribution of the connection bridges facilitates the transmission of torque within the suspension member 100.

In practice, irrespective of the number of connection bridges 128, the minimum value of the angle β is preferably equal to half the value of the angle α.

We consider a pair of two adjacent branches or beams, i.e., two branches or beams connected by a corner, at one of the bridges 128. This is for example the case of the branches 121 and 122 that are adjacent at the bridge 128 arranged on the face 120B in the corner $C_{12}$. When the member 100 is subjected to a torsional force T, at least one branch or beam or this pair of branches or beams 121 and 122 works in flexion around this bridge 128. The same is true in the other pairs of adjacent branches or beams. In other words, the branches 121 to 126 tend to bend under a torsional load, around bridges 128, which impart a certain flexibility to the member 100 and in particular allow it to contain the vibrations.

The suspension member 200 is made on the same principle as the suspension member 100 and also comprises planar annular plates 220 arranged in an intermediate portion 210 of the suspension member 200, this intermediate portion being arranged between a first end portion 202 and a second end portion 204 of the suspension member 200 that extends along a longitudinal axis X200.

The plates 220 are distributed between an end plate 220$_2$ alongside the first end portion 202, an end plate 220$_4$ alongside the second end portion 204 and intermediate plates 220$_i$ arranged, along the axis X200, between the end plates 220$_2$ and 220$_4$.

The intermediate part 210 of the suspension member 200 is similar to the intermediate part 110 of the suspension member 100, each intermediate annular plate 220$_i$ being connected to the adjacent plate by two series of connection bridges 228, of which there are at least three. This makes it possible to obtain the same advantages, in terms of torsional stiffness and flexural flexibility, as with the suspension member 100.

According to one optional aspect of the invention, the portions 110 and 210 are identical, which is advantageous in particular in manufacturing terms.

The first end portion 202 of the suspension member 100 has an hexagonal interior form and provided with three passage orifices 206 for three screws for interlocking the suspension member 200 with a flange 24. Only one of these screws is visible in FIGS. 3 and 5, with reference 266, having specified that the other two screws are distributed at 120° relative to this screw, around axes X16 and X200, superimposed. The flange 24 is in turn immobilized on an output shaft 25 of the actuator 12, using a screw 26 that is aligned on the axis X16. Thus, the orifices 206 and the inner shape of the end portion 202 constitute an interface for interlocking the member 200 with the output shaft 25, through the flange 24 and the screw 26.

Alternatively, the first end portion 202 of the suspension member 200 is interlocked directly with the output shaft 25 of the electromechanical actuator 12. Forms of rotational interlocking other than screws can also be considered, for example appropriate shape cooperation.

The output shaft 25 is equipped with a liner 27 that cooperates with a wheel 28 immobilized in the winding shaft 4 by shape cooperation. The wheel 28 constitutes a torque transmission member between the output shaft 25 and the winding tube 4.

A rotational guide member 300 is immobilized in the casing 18, near its second end 18B opposite its first end 18A. The member 300 forms a bearing that supports the output shaft 25 at the end 18B, with the possibility of rotation of the output shaft 25 relative to the casing, around the axis X16.

Furthermore, the end portion 204 of the suspension member 200 is provided with inner splines 230 complementary to the outer splines 174 of the output shaft 17, which makes it possible to secure the suspension member 200 and the output shaft 17 of the motor 16 in rotation. The end portion 204 is therefore interlocked in rotation with the output shaft 17 of the electric motor 16 by a slide link. Thus, when the motor 16 operates, the torque available on the output shaft 17 can be transmitted to the output shaft 25, and beyond the winding tube 4, through the suspension member 200. To that end, it is important for the suspension member 200 to have a good torsional stiffness in the direction of the arrow T in FIG. 12, which is obtained owing to the structure of its intermediate portion 210, which comprises the plates 220 and the connection bridges 228. Furthermore, the suspension member 200 has a good flexibility in flexion and shear, in particular in the direction of arrow F in FIG. 12, which makes it possible to filter the noise generated at the electric motor 16.

FIGS. 14 and 15 show the outer and inner hexagonal sections of the suspension member 200.

The properties and the variants mentioned above regarding the first suspension member 100 also apply to the second suspension member 200.

These two suspension members have, aside from a flexural flexibility in the direction of arrows F in FIGS. 6 and 12, a compression flexibility, in a direction parallel to the axes X100 and X200 shown by the double arrow Co in these figures. This also makes it possible to filter the vibrations coming from the motor 16. This compression flexibility results from the flexibility of the assembly of the compression member in a direction parallel to the axis X100 or X200.

In this embodiment, the first suspension module 10 is formed, in its entirety, by the suspension member 100. The second suspension module 20 is formed by the assembly of the suspension member 200 with the flange 24. In both cases, the active part of the suspension member, comprising the plates 120$_i$, is in one piece.

FIGS. 16 to 20 show a suspension module 10 according to another embodiment and capable of being used in place of the suspension module 10 as described relative to FIGS. 3 to 11. Hereinafter, we primarily describe what distinguishes this suspension module from that of FIGS. 3 to 11. For the rest, this suspension module 10 is comparable to that of FIGS. 3 to 11, has the same features and operates in the same way.

The suspension module 10 of FIGS. 16 to 19 comprises a single-piece suspension member 100, comprising an end portion 102 and an intermediate portion or body 110. The suspension module 10 comprises a second end portion 104, made up of a first end piece 150 attached on the intermediate portion 110 using three screws 151.

Like before, reference X100 denotes the longitudinal axis of the suspension member 100. The elements 100 and 150 are juxtaposed along the axis X100.

Like in the previous embodiment, the suspension member 100, and in particular the intermediate part 110, comprises a certain number of flat annular plates 120$_i$, including two end plates 120$_2$ and 120$_4$ and a certain number of intermediate plates 120$_i$. Like before, connection bridges 128 connect each intermediate plate 120$_i$ with the adjacent plates, in particular three connection bridges.

The thickness e120 of an intermediate plate 120$_i$ varies over its circumference. More specifically, this thickness increases approaching a bridge 128, such that the thickness e140 of a slit 140 arranged, axially, between two intermediate plates 120$_i$, and circumferentially, between two bridges 128 that join these two plates, decreases approaching bridges 128. In practice, the junction zone $Z_{100}$ between a connection bridge 128 and the two plates located on either side thereof along the axis X100 is rounded with a curve radius R smaller than the maximum value of the thickness e140.

This geometry of the plates 120$_i$ and junction zones 2100 makes it possible to smooth the mechanical stresses that are applied within the body 110, between the parts 120$_i$ and 128. Manufacturing by molding is also easier than for the embodiment of FIGS. 3 to 11.

Furthermore, as is apparent from FIG. 17, the inner surface S110 of the intermediate portion 110 of the suspension member 100 fits in a circular sheath E110 shown in axis lines, which is convergent toward the end 102 and the apical angle of which is denoted α. This angle α has a small value, below 3°, and preferably around 0.5°, such that the difference in diameter between the surface S110 near the portion 102 and this same surface of the disc 120$_4$ furthest from the portion 102 is several tenths of millimeters. The frustoconical nature of the surface S110 facilitates the stripping of the suspension member 100 and makes it possible to use a maximum diameter of the side of the first end piece 150, which is intended to immobilize in the casing 18 visible in FIGS. 3 and 4 or in a casing of the same nature. The part of minimum diameter of the intermediate portion 110 is situated on the side of the portion 102, i.e., the side of the suspended mass made up of the motor 16, this side being that where the movements are of greatest amplitude. This favors the suspension of the suspended mass.

A polygonal tube 130, in the example hexagonal, is integrated into the suspension module 10 while being arranged inside the intermediate portion 110, This hexagonal tube is for example made from polyamide 6.6 filled with glass fiber or polybutylene terephthalate (PBT) filled with glass fibers, which has a Young's modulus of about 12,500 MegaPascal, or from metal. In all cases, the material of the tube is both stiffer and mechanically stronger than the material, in particular polyacetal or polyamide, used for the molding of the body 100.

The outer shape of the hexagonal tube 130 is adapted to the inner shape of the intermediate portion 110, such that, once aligned on the axis X100, the hexagonal tube 130 extends, radially inside the plates 120, at a small radial distance therefrom and without touching them. The hexagonal tube 130 therefore does not interfere with the attenuation of the vibrations obtained owing to the suspension member 100.

The immobilization of the hexagonal tube 130 inside the suspension member 100 is obtained using three tongues or tabs, two of which are visible in FIG. 18 with reference 132 and which are engaged in three notches 134 of corresponding shape provided in the plate 120$_4$, two of which are visible in FIG. 18. Once the tabs 132 are engaged in the notches 134, the elements 100 and 130 are secured in rotation around the axis X100, by shape cooperation.

Furthermore, the placement of the first end piece 150 at the end of the suspension member 100 and the tightening of the screws 151 make it possible to retain the tabs 132 inside the notches 134. The tabs 132 are sandwiched between the bottom of the notches 134 and the end piece 150, which axially immobilizes the hexagonal tube 130 inside the suspension member 100, in particular relative to the intermediate plates 120*i*.

The polygonal tube also comprises notches 133, at an end 131 opposite the tabs 132, These notches cooperate with corresponding ribs, not shown, inside the suspension member 100. During normal operation, the notches 133 are not in contact with the corresponding ribs.

The length of the polygonal tube is slightly greater than the active part of the suspension member, namely the intermediate part 110 comprising the plates 120*i*.

The first end piece 150 is provided with a skirt 152 with a hexagonal section that caps, i.e., radially surrounds, a portion 136 of the hexagonal tube 130 that is also in the form of a hexagonal skirt, with dimensions transverse to the axis X100 that are smaller than that of the skirt 152. One thus obtains an axial overlap of the skirt 136 by the skirt 152, as visible in FIG. 17. This guarantees effective centering of the hexagonal tube 130 inside the suspension member 100, The skirt 152 also fits in the inner hexagonal section of the intermediate portion 110 of the suspension member 100. The first end piece 150 and the suspension member 100 are thus blocked relative to one another in rotation.

In order to allow the first end piece 150 to be mounted on the suspension member 100, with placement of the skirt 152 around the skirt 136, the skirt 152 is locally interrupted by notches 154, to allow the tabs 132 to pass in the mounted configuration of the suspension module 10.

As visible in FIG. 17, the hexagonal tube 130 is equipped, on its inner peripheral surface, with stiffening ribs 138 that extend, from its end closest to the tabs 132, toward the end portion 102 when the hexagonal tube 130 is mounted inside the suspension member 100. The ribs 138 stop at an axial distance d138 from the end 131 of the hexagonal tube 130 opposite the tongues 132. This distance d138 is non-nil, which guarantees that there is no interference between these ribs 138 and a part of the motor 16 introduced into the suspension member 100 through the end portion 102, even if this part of the motor 16 engages inside the hexagonal tube 130, through its end 131.

In case of rupture of one or several connection bridges 128 and/or one or several plates 120, the hexagonal tube 130 makes it possible to transmit a torque around the axis X100, between the end portions 102 and 104 of the suspension member 100, by becoming blocked inside the inner hexagonal shape of the suspension member 100. The hexagonal tube 130 thus performs a safety function inside the suspension member 100, It is noted that, once mounted within the suspension member 100, the hexagonal tube 130 performs a torsional reinforcing function of this suspension member if the latter experiences a torque exceeding a predefined torque, for example around the nominal torque for which the actuator is dimensioned or twice this nominal torque. By becoming blocked inside the inner hexagonal shape of the suspension member 100, it effectively opposes a tearing risk of the connection bridges 128 by shearing, since it can absorb part of a torque exerted between the end portions 102 and 104. The tube therefore participates in the transmission of torque between the ends 102 and 104, including when the body 100 is not damaged. This is the case when the module experiences a torque exceeding a predefined torque, in particular above the nominal torque, or if the suspension member has experienced significant creep, when the module experiences a torque below the nominal torque. The rupture risks of the bridges 128 or the plates 120 are therefore minimized, or even canceled out.

The suspension module 20 of FIGS. 20 and 21 comprises a single-piece suspension member 200 with which a second end piece 250 is associated, attached on the intermediate portion 210, using screws 251, in a manner equivalent to the first end piece 150.

The suspension member 200 is identical to the suspension member 100 and comprises a first end 202 and an intermediate portion 210 that includes plates 220 respectively identical to the elements 102, 110 and 120 of the embodiment of FIGS. 16 to 20, which are connected by connection bridges 228.

A polygonal tube 230, preferably hexagonal and identical to the tube 130, is inserted into the portion 210, like in the embodiment of FIGS. 16 to 20. Reliefs 232 and 234 respectively identical to the reliefs 132 and 134 are provided and blocked engaged by the second end piece 250 when it is in place on the intermediate portion 210. The end piece 250 here plays the role of the flange 24 shown in FIG. 5. The polygonal tube 230 also comprises notches 233 that have the same function as the notches 133 of the tube 130.

The end piece 250 is provided with a skirt 252 and notches 254 that have the same function as the parts 152 and 154 of the embodiment of FIGS. 16 to 20, namely surrounding a portion 236 of the hexagonal tube 230 and fitting into a hexagonal section inside the intermediate portion 210. The end piece 250 further comprises a central sleeve 256, the function of which is to form a guide shaft for a fastening screw, not shown, similar to the screw 26 visible in FIG. 5.

During the mounting of the actuator 12, the maximum diameter of the intermediate portion 210 of the suspension member 200 is situated on the side of the second end piece 250 and the part of minimum diameter of the intermediate portion 210 is situated on the side of the portion 202, i.e., the side of the suspended mass made up of the motor 16.

Since the suspension members 100 and 200 of the embodiments of FIGS. 16 to 22 are identical, using a single type of suspension member 100/200, with two different end pieces 150 and 250, the industrial production of suspension modules 10 and 20 is favored, while keeping advantages during use, in particular favoring the suspension of the suspended mass.

The same is true when the polygonal tubes 130 and 230 are identical as considered above.

In the two embodiments of FIGS. 16 to 22, the polygonal tubes 130 and 230 mechanically protect electrical cables that pass longitudinally through the suspension modules 10 and/or 20, if applicable, like the cable 19 of the first embodiment.

In the embodiment of FIGS. 16 to 20, the suspension module 10 is formed by parts 100, 130 and 150. In the embodiment of FIGS. 21 and 22, the suspension module is formed by parts 200, 230 and 250.

Irrespective of the embodiment, the number of connection bridges 128 or 228 can be greater than or equal to four.

The invention is shown above in the case where the two suspension modules 10 and 20 are arranged inside the tubular casing 18. In a variant, at least one of these suspension elements can be arranged outside such a casing. Alternatively, an additional suspension module can be arranged outside such a casing.

The number of branches of an annular plate 120 or 220 can be different from six. In this case, the distribution of the connection bridges 128 or 228 is adapted.

In a variant, the section of the suspension members 100 and 200 can be polygonal, without being hexagonal, for example octagonal. In this case, if the suspension module includes a polygonal tube, the section of this tube is adapted to that of the suspension member.

According to another variant, only one suspension module 10 or 20 can be used within the actuator 12. The potential other suspension module can then be according to the state of the art.

The embodiments and alternatives considered above may be combined with one another to generate new embodiments of the invention.

The invention claimed is:

1. A suspension module for an electric motor inside a tubular casing of an electromechanical actuator for a closure or sun protection facility, comprising a single-piece suspension member, extending along a longitudinal axis aligned on a rotation axis of a rotor of the electric motor, wherein the suspension member comprises several annular plates arranged perpendicular to the longitudinal axis and juxtaposed along this axis, including at least one intermediate annular plate, and wherein each intermediate annular plate is connected to each of the two plates that are adjacent to it, by at least three connection bridges.

2. The suspension module according to claim 1, wherein each connection bridge forms a bearing point allowing the plates to deform when flexion and shear forces are applied to the suspension member.

3. The suspension module according to claim 1, wherein the connection bridges located on a first axial face of an intermediate annular plate are angularly offset, around the longitudinal axis, relative to the connection bridges located on a second axial face of the same annular plate, opposite the first axial face.

4. The suspension module according to claim 3, wherein each axial face of an intermediate annular plate is equipped with three connection bridges distributed at 120° around the longitudinal axis, and wherein two connection bridges arranged on the two opposite axial faces of this intermediate annular plate are angularly offset by 60° or 180° around the longitudinal axis.

5. The suspension module according to claim 1, wherein each annular plate is formed by a series of beams and wherein each connection bridge is arranged at the junction between two adjacent beams on the circumference of the annular plate.

6. The suspension module according to claim 5, wherein at least one beam of a pair of two adjacent beams works in flexion around a connection bridge between these beams when the suspension member undergoes a torsional force around its longitudinal axis.

7. The suspension module according to claim 5, wherein at least some of the beams of an annular plate work in compression when the suspension member undergoes a torsional force around its longitudinal axis.

8. The suspension module according to claim 1, wherein the thickness of an intermediate plate, measured parallel to the longitudinal axis, increases as it approaches a connection bridge.

9. The suspension module according to claim 1, wherein the suspension module further comprises a polygonal tube arranged inside the intermediate plate(s) of the suspension member, this polygonal tube being configured to transmit a torque between two end portions of the suspension module.

10. The suspension module according to claim 9, wherein the polygonal tube and an intermediate portion of the suspension member, which includes the plates, are provided with members for blocking the relative rotation around the longitudinal axis.

11. The suspension module according to claim 10, wherein the suspension module further comprises an end piece attached on the intermediate portion and wherein blocking members provided on the polygonal tube are locked, axially and in rotation, in corresponding housings of the intermediate portion when the end piece is in place on the intermediate portion.

12. The suspension module according to claim 11, wherein, when the end piece is in place on the intermediate portion, a skirt of this end piece radially surrounds a portion of the polygonal tube and fits in an inner polygonal section of the intermediate portion.

13. The suspension module according to claim 1, wherein the suspension module further comprises, at a first axial end portion, an interface for interlocking, in rotation around the longitudinal axis, with a stationary part of the motor and, at a second axial end portion opposite the first end portion, an interface for centering and immobilization in the tubular casing.

14. The suspension module according to claim 13, wherein the intermediate annular plates, and the connection bridges are arranged in an intermediate portion of the suspension member situated, along the longitudinal axis, between the first end portion and the second end portion.

15. The suspension module according to claim 1, wherein the suspension module further comprises, at a first axial end portion, an interface for interlocking, in rotation around the longitudinal axis, with an output shaft of the actuator and, at a second end portion opposite the first end portion, an interface for interlocking, in rotation around the longitudinal axis, with an output shaft of the electric motor.

16. The suspension module according to claim 15, wherein the intermediate annular plates and the connection bridges are arranged in an intermediate portion of the suspension member situated, along the longitudinal axis, between the first end portion and the second end portion.

17. An electromechanical actuator for a closure or sun protection facility, this actuator comprising an electric motor mounted inside a tubular casing, wherein the electric motor is suspended in the tubular casing using at least one suspension module comprising a single-piece suspension member, extending along a longitudinal axis aligned on a rotation axis of a rotor of the electric motor, wherein the suspension member comprises several annular plates arranged perpendicular to the longitudinal axis and juxtaposed along this axis, including at least one intermediate annular plate, and wherein each intermediate annular plate is connected to each of the two plates that are adjacent to it, by at least three connection bridges.

18. The electromechanical actuator according to claim 17, wherein the electric motor is suspended in the tubular casing using:
a first suspension module that couples a stationary part of the electric motor in rotation with the tubular casing,
a second suspension module that couples an output shaft of the electric motor in rotation with an output shaft of the actuator.

19. The electromechanical actuator according to claim 18, wherein the suspension members of the two suspension modules are identical and each associated with a first specific end piece.

20. A closure or sun protection facility comprising a suspension member comprising a single-piece suspension member, extending along a longitudinal axis aligned on a rotation axis of a rotor of an electric motor of the facility, wherein the suspension member comprises several annular plates arranged perpendicular to the longitudinal axis and juxtaposed along this axis, including at least one intermediate annular plate, and wherein each intermediate annular plate is connected to each of the two plates that are adjacent to it, by at least three connection bridges.

* * * * *

UNITED STATES PATENT AND TRADEMARK OFFICE
CERTIFICATE OF CORRECTION

PATENT NO. : 10,770,950 B2
APPLICATION NO. : 16/467389
DATED : September 8, 2020
INVENTOR(S) : Sébastien Lemaitre et al.

It is certified that error appears in the above-identified patent and that said Letters Patent is hereby corrected as shown below:

On the Title Page

Please amend Item (54) to read as follows:
-- (54) SUSPENSION MODULE, ELECTROMECHANICAL ACTUATOR COMPRISING SUCH A SUSPENSION MODULE, AND CLOSURE OR SUN PROTECTION SYSTEM COMPRISING SUCH A SUSPENSION MODULE OR SUCH AN ELECTROMECHANICAL ACTUATOR --

Please amend Item (73) to read as follows:
-- (73) Assignee: SOMFY ACTIVITES SA, Cluses (FR) --

Signed and Sealed this
Twenty-second Day of December, 2020

Andrei Iancu
*Director of the United States Patent and Trademark Office*